United States Patent
Jiang et al.

(10) Patent No.: US 9,961,273 B2
(45) Date of Patent: May 1, 2018

(54) MOBILE TERMINAL AND SHOOTING METHOD THEREOF

(71) Applicant: NUBIA TECHNOLOGY CO., LTD., Shenzhen, Guangdong (CN)

(72) Inventors: Junmin Jiang, Shenzhen (CN); Rong Jin, Shenzhen (CN)

(73) Assignee: NUBIA TECHNOLOGY CO., LTD., Shenzhen, Guangdong (CN)

( * ) Notice: Subject to any disclaimer, the term of this patent is extended or adjusted under 35 U.S.C. 154(b) by 0 days. days.

(21) Appl. No.: 15/126,461

(22) PCT Filed: Aug. 30, 2014

(86) PCT No.: PCT/CN2014/085638
§ 371 (c)(1),
(2) Date: Sep. 15, 2016

(87) PCT Pub. No.: WO2015/143841
PCT Pub. Date: Oct. 1, 2015

(65) Prior Publication Data
US 2017/0085808 A1 Mar. 23, 2017

(30) Foreign Application Priority Data
Mar. 24, 2014 (CN) .......................... 2014 1 0112141

(51) Int. Cl.
*H04N 5/262* (2006.01)
*H04N 5/232* (2006.01)
*H04N 5/225* (2006.01)

(52) U.S. Cl.
CPC ......... *H04N 5/2621* (2013.01); *H04N 5/2257* (2013.01); *H04N 5/23222* (2013.01);
(Continued)

(58) Field of Classification Search
None
See application file for complete search history.

(56) References Cited

U.S. PATENT DOCUMENTS 6,476,824 B1 * 11/2002 Suzuki ................. G09G 3/2055
345/690
8,896,728 B2   11/2014 Fujii
(Continued)

FOREIGN PATENT DOCUMENTS

CN          1604620 A     4/2005
CN         201181565 Y    1/2009
(Continued)

OTHER PUBLICATIONS

International Search Report in international application No. PCT/CN2014/085638, dated Dec. 30, 2014.
(Continued)

*Primary Examiner* — James Hannett
(74) *Attorney, Agent, or Firm* — Arent Fox LLP; Michael Fainberg

(57) ABSTRACT

Disclosed are a mobile terminal and a shooting method thereof. The shooting method comprises the steps of: collecting, by a camera, image data continuously; conducting an addition operation on the current image data and the past image data, so as to generate a synthetic image; and displaying the synthetic image in real time. Thus, an image superposition technique is adopted to simulate long-time exposure, which adds a light painting function to a mobile terminal, so that a user can use the light painting function of the mobile terminal to conduct artistic creation, and can preview the creation effect in real time, thereby improving the user experience.

15 Claims, 3 Drawing Sheets

(52) U.S. Cl.
CPC ..... *H04N 5/23229* (2013.01); *H04N 5/23245* (2013.01); *H04N 5/23248* (2013.01); *H04N 5/23254* (2013.01); *H04N 5/23293* (2013.01)

(56) References Cited

U.S. PATENT DOCUMENTS

| | | | |
|---|---|---|---|
| 2010/0128126 A1* | 5/2010 | Takeuchi | G08B 13/1961 348/143 |
| 2012/0287310 A1 | 11/2012 | Fujii | |
| 2013/0107106 A1 | 5/2013 | Nakai et al. | |
| 2014/0055638 A1* | 2/2014 | Son | H04N 5/2353 348/229.1 |
| 2015/0365590 A1* | 12/2015 | Ishizuka | G03B 9/64 348/211.99 |
| 2017/0171443 A1* | 6/2017 | Mobbs | H04N 5/2329 |

FOREIGN PATENT DOCUMENTS

| | | |
|---|---|---|
| CN | 101527792 A | 9/2009 |
| CN | 101620667 A | 1/2010 |
| CN | 102714699 A | 10/2012 |
| CN | 103095984 A | 5/2013 |
| CN | 103634530 A | 3/2014 |
| CN | 103888683 A | 6/2014 |
| JP | 2000101987 A | 4/2000 |
| JP | 2000261715 A | 9/2000 |
| JP | 2001249379 A | 9/2001 |
| JP | 2004098917 A | 4/2004 |
| JP | 2004187182 A | 7/2004 |
| JP | 2005117285 A | 4/2005 |
| JP | 2006194801 A | 7/2006 |
| JP | 2007053439 A | 3/2007 |
| JP | 2008092510 A | 4/2008 |
| JP | 2008259044 A | 10/2008 |
| JP | 2011118523 A | 6/2011 |
| JP | 2012039440 A | 2/2012 |
| KR | 20140027816 A | 3/2014 |

OTHER PUBLICATIONS

English Translation of the Written Opinion of the International Search Authority in international application No. PCPCN2014/085638, dated Dec. 30, 2014.

* cited by examiner

MOBILE TERMINAL AND SHOOTING METHOD THEREOF

CROSS-REFERENCE TO RELATED APPLICATIONS

This application is a US National Stage of International Application No. PCT/CN2014/085638, filed on Aug. 30, 2014, designating the United States and claiming the priority to Chinese Patent Application No. 201410112141.2, filed on Mar. 24, 2014, the content of which is hereby incorporated by reference in its entirety.

TECHNICAL FIELD

The disclosure relates to, the technical field of camera shooting, and in particular to a mobile terminal and a shooting method thereof.

BACKGROUND

Along with continuous improvement of camera shooting hardware of mobile terminals such as mobile phones, tablets and the like, shooting functions of mobile terminals become more and more diversified and shooting requirements of users on mobile terminals also increase. A current mobile terminal has shooting function which is dependent on a related processing, algorithm provided by camera shooting hardware equipment and a chip provider, and only has fixed shooting modes such as focusing, white balance and the like.

In recent years, a shooting mode of light painting photography rises, which may be used by a user to carry out artistic creation. Light painting photography refers to a shooting mode of performing long-time exposure and creating a special image by virtue of a change of a light source in an exposure process. Corresponding photosensitive hardware is required to support long-time exposure, but photosensitive hardware capable of supporting long-time exposure is expensive, so that only a professional camera shooting device such as a single lens reflex has a light painting photography function. Therefore, existing mobile terminals do not have the light painting photography function under limits of camera shooting hardware, and may not meet requirements of users on utilization of the light painting photography function for artistic creation. In addition, when a professional camera shooting device is utilized for light painting photography shooting, a user may not preview a creation result in real time, so that an error may not be corrected timely, and creation efficiency is low.

SUMMARY

A main purpose of the disclosure is to provide a mobile terminal and a shooting method thereof, so as to add a light painting photography function to the mobile terminal to meet an artistic creation requirement of a user and improve a user experience.

In order to achieve the purpose, the disclosure discloses a shooting method for a mobile terminal, which may include the following steps that:

a camera continuously collects image data;

the image data is read at time intervals, addition operation is performed on current image data and previous image data, and a synthetic image is generated; and the synthetic image is displayed.

Preferably, the step that addition operation is performed on the current image data and the previous image data may include that:

pixels meeting a preset condition are selected from the current image data and the previous image data, and addition operation is performed on the pixels at the same position.

Preferably, the step that the pixels meeting the preset condition are selected may include that:

whether a luminance parameter of the pixel is more than its threshold value or not is judged; and on the condition that the luminance parameter of the pixel is more than its threshold value, the pixel is determined to meet the preset condition, and the pixel is selected.

Preferably, the step that the pixels meeting the preset condition are selected may include that:

whether the pixel is a sudden changing pixel or not is judged;

on the condition that the pixel is a sudden changing pixel, a mean value of luminance parameters of a preset number of pixels around the sudden changing pixel is calculated, whether the mean value is more than its threshold value or not is judged, and on the condition that the mean value is more than its threshold value, the sudden changing pixel is determined to meet the preset condition, and the sudden changing pixel is selected; and on the condition that the pixel is not a sudden changing pixel, whether the luminance parameter of the pixel is more than its threshold value or not is further judged, and on the condition that the luminance parameter of the pixel is more than its threshold value, the pixel is determined to meet the preset condition, and the pixel is selected.

Preferably, the camera may be a rear camera, and the method may further include that mirroring processing is performed on the collected image data after the step that the camera continuously collects the image data.

Preferably, the camera may be a rear camera, and the method may further include that: mirroring processing is performed on the synthetic image, after the step that the synthetic image is generated.

Preferably, the camera may be a front camera.

Preferably, the method may further include that:

before the step that the camera continuously collects the image data, when a shooting instruction is received, shooting is started after a preset time delay.

The disclosure further discloses a mobile terminal, which may include an image collecting module, an image synthesis module and a display module, wherein the image collecting module may be configured to call a camera to continuously collect image data;

the image synthesis module may be configured to read the image data at time intervals, perform addition operation on current image data and previous image data, and generate a synthetic image; and the display module may be configured to display the synthetic image.

Preferably, the image synthesis module may further be configured to: select pixels meeting a preset condition from the current image data and the previous image data, and perform addition operation on the pixel at the same position.

Preferably, the image synthesis module may further be configured to: judge whether a luminance parameter of the pixel is more than its threshold value or not, and on the condition that the luminance parameter of the pixel is more than its threshold value, determine that the pixel meets the preset condition.

Preferably, the image synthesis module may be configured to:

judge whether the pixel is a sudden changing pixel or not;

on the condition that the pixel is a sudden changing pixel, calculate a mean value of luminance parameters of a preset number of pixels around the sudden changing pixel, judge whether the mean value is more than its threshold value or not, and on the condition that the mean value is more than its threshold value, determine that the sudden changing pixel meets the preset condition and select the sudden changing pixel; and on the condition that the pixel is not a sudden changing pixel, further judge whether the luminance parameter of the pixel is more than its threshold value or not, and on the condition that the luminance parameter of the pixel is more than its threshold value, determine that the pixel meets the preset condition and select the pixel.

Preferably, the mobile terminal may further include a mirroring module which may be configured to: judge whether the currently used camera is a rear camera or not, and on the condition that the currently used camera is the rear camera, perform mirroring processing on the collected image data.

Preferably, the mobile terminal may further include a mirroring module which may be configured to: judge whether the currently used camera is a rear camera or not, and on the condition that the currently used camera is the rear camera, perform mirroring processing on the synthetic image.

Preferably, the mobile terminal may further include an anti-shake module which may be configured to, when a shooting instruction is received, send the shooting instruction to the image collecting module after a preset time delay.

The disclosure further discloses a shooting method for a mobile terminal, which may include steps of that:

image data is collected in a continuous shooting mode;

the image data is read at time intervals, addition operation is performed on current image data and previous image data, and a synthetic image is generated; and the synthetic image is displayed.

According to the shooting method for the mobile terminal in the disclosure, the image data is continuously collected, addition operation is performed on the current image data and the previous image data, and the synthetic image is generated and displayed in real time, so that long-time exposure is simulated by adopting an image superposing technology, the light painting photography function is added to the mobile terminal, then the user may utilize the light painting photography function of the mobile terminal for artistic creation and preview a creation result in real time, and the user experience is improved.

Mirroring processing is further performed on the collected image data and then the synthetic image is generated to make the displayed synthetic image completely consistent with work actually created by a creator, so that the creator is not required to perform mirroring processing on the created work in advance, difficulty in light painting creation of the creator is reduced, and the user experience is improved.

In addition, the front camera of the mobile terminal may further be utilized for light painting photography, and on one hand, an image collected by the front camera is completely consistent with the actually created work without mirroring processing; and on the other hand, the creator may preview own work in real time while he/she performs light painting creation to timely correct and regulate the work, so that creation efficiency is improved, and the creation experience is improved.

Achievement of the purpose, function characteristics and advantages of the disclosure will be further described in conjunction with embodiments with reference to the drawings.

DETAILED DESCRIPTION

It should be understood that specific embodiments described herein are only adopted to explain the disclosure and not intended to limit the disclosure.

Figure 1:
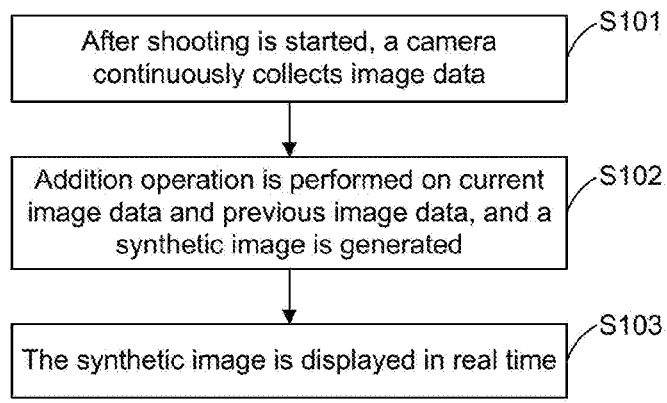
FIG. 1 is a flowchart of a first embodiment of a shooting method for a mobile terminal according to the disclosure.

Referring to FIG. 1, the disclosure discloses a first embodiment of a shooting method for a mobile terminal, and the shooting method includes the following steps.

Step 101: after shooting is started, a camera continuously collects image data.

According to the disclosure, a light painting photography mode is added to a shooting function of the mobile terminal, and a user may select the light painting photography mode or an ordinary camera shooting mode for shooting, wherein the light painting photography mode regulates and limits a parameter such as an International Standards Organization (ISO), quality of a picture and a scene mode in advance with reference to a requirement of a light painting photography scene, and outputs the parameters to related hardware equipment to enable the related hardware equipment to perform sample selection or processing on the collected image data. For example, light painting photography is usually performed in a dark environment, and obviously, the ISO is regulated to minimum; the quality of the picture such as a resolution may optionally be higher or lower; and a night scene may be selected a scene mode.

When the user selects the light painting photography mode and presses a shooting key or triggers a virtual shooting key, the mobile terminal starts light painting shooting and continuously collects the image data by using the camera, and a collecting speed in which image data is collected continuously by the camera may be preset. The camera is required to continuously collect at least more than 10 images within 1 second to ensure light painting continuity, but subsequent image synthesis processing usually may not keep following image collecting, so that the image data is preferably cached in a caching module (of course, caching may also not be required on the condition that a processing speed of the mobile terminal is high enough). Furthermore, in the process of collecting the image data, the mobile terminal may regulate the collecting speed in real time according to a free space of the caching module, thereby maximally utilizing a processing capability of the mobile terminal and preventing data overflow and further data loss caused by excessively high collecting speed.

Step 102: addition operation is performed on current image data and previous image data, and a synthetic image is generated.

An image synthesis module of the mobile terminal directly receives and reads the collected image data; or the image data for image synthesis is read in real time from the caching module, and the caching module is reset to clear the data therein to provide a space for subsequent data. The Speed or time interval in which the image data is read by the image synthesis module may be preset, or depends on a calculation speed of the mobile terminal. The image synthesis module superposes pixels in the current image data and the previous image data to generate the synthetic image. Since the camera continuously collects the image data, the synthetic image is also continuously generated in reap time.

Preferably, the image synthesis module selects pixels meeting a preset condition from the current image data, and the previous image data, and then performs addition operation on the pixels. In the disclosure, the previous image data is a sum of image data collected in the past, and may also be considered as a synthetic image generated by previous addition operation.

In some embodiments, when judging whether a certain pixel meets the preset condition or not, the image synthesis module may directly judge whether a luminance parameter of the pixel is more than its threshold value or not, and on the condition that the luminance parameter of the pixel is more than its threshold value, determines that the pixel meets the preset condition. After selecting pixels, of which luminance parameters are more than its threshold value, from the current image data and the previous image data (that is, absolute values of luminance of certain points on the image are more than its threshold value), the image synthesis module only performs addition operation on these pixels meeting the preset condition, thereby filtering pixels with lower luminance to a certain extent and avoiding that an ambient light accumulation effect pollutes a picture of the finally synthesized image. A magnitude of the threshold value may be determined according to mean luminance of the image; and the luminance parameter is an optical parameter such as a Red Green Blue (RGB) value and a YUV value.

For example, the image data includes totally n pixel units, i.e. pixel unit 1, pixel unit 2 . . . pixel unit n, wherein luminance, parameters of pixel units 101 to 200 in the current image data are more than its threshold value, luminance parameters of pixel units 1 to 100 in the previous image data are more than its threshold value, and then addition operation is performed on the current and previous luminance parameters, of pixel units 1 to 200. On the condition that a luminance parameter value of pixel unit 1 in the current image data is 10 while the luminance parameter value of pixel unit 1 in the previous image data is 100, the luminance parameter value of pixel unit 1 in the synthetic image is 100+10=110 as a result of the addition operation. In addition, the image synthesis module further performs noise reduction processing on the synthetic image, and also controls a synthesis proportion of the new synthetic image to inhibit over-exposure according to exposure of the existing image.

Figure 2:
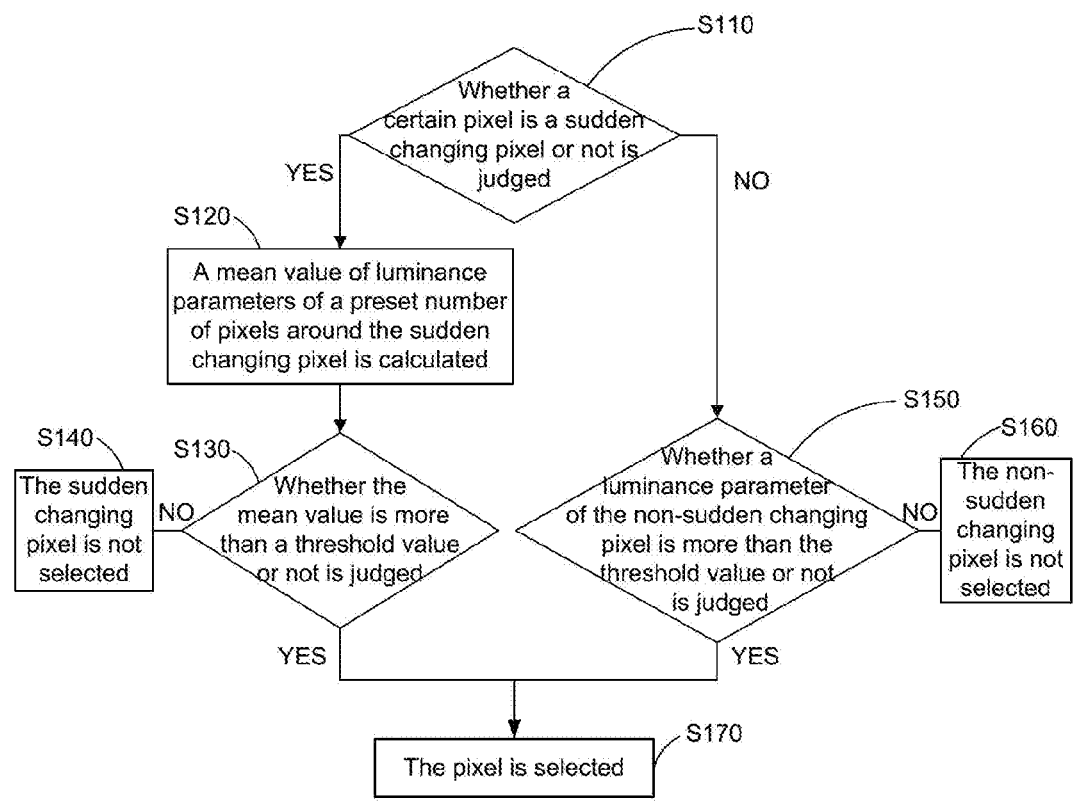
FIG. 2 is a flowchart of selecting pixels meeting a preset condition by a mobile terminal.

As shown in FIG. 2, in a preferred embodiment, the image synthesis module selects the pixel meeting the preset condition by the following steps.

Step 110: whether a certain pixel is a sudden changing pixel or not is judged.

The image synthesis module compares a luminance parameter of a certain pixel with a mean value of luminance parameters of a plurality of (preferably 8) pixels around the pixel, and determines that the pixel is a sudden changing pixel on the condition that its luminance parameter is higher than or lower than preset times of the mean value, preferably higher than double of the mean value or lower than a half of the mean value. On the condition that the pixel is a sudden changing pixel, Step 120 is performed; and on the condition that the pixel is not a sudden changing pixel, Step 150 is performed.

Step 120: a mean value of luminance parameters of a preset number of pixels around the sudden changing pixel is calculated.

On the condition that the pixel is a sudden changing pixel, the mean value of the luminance parameters of the pixels around the sudden changing pixel is calculated, wherein the pixels around the sudden changing pixel are preferably pixels which are compared with the sudden changing pixel in Step 110, and the preset number is preferably 8.

Step 130: whether the mean value is more than its threshold value or not is judged.

On the condition that the mean value is more than its threshold value, the sudden changing pixel is determined to meet the preset condition, and Step 170 is performed; and on the condition that the mean value is less than or equal to its threshold value, it is determined that the sudden changing pixel does not meet the preset condition, and Step 140 is performed.

Step 140: the sudden changing pixel is not selected.

Step 150: whether the luminance parameter of the non-sudden changing pixel is more than its threshold value or not is judged.

On the condition that the pixel is not a sudden changing pixel, i.e. a non-sudden changing pixel, the luminance parameter of the non-sudden changing pixel is directly compared with its threshold value. On the condition that its luminance parameter is more than its threshold value, the pixel is determined to meet the preset condition, and Step 170 is performed; and on the condition that the luminance parameter is less than or equal to its threshold value, it is determined that the pixel does not meet the preset condition, and Step 160 is performed.

Step 160: the non-sudden changing pixel is not selected.

Step 170: the pixel is selected.

After the pixel (the sudden changing pixel or the non-sudden changing pixel) is determined to meet the preset condition, the pixel is selected, addition operation is subsequently performed and the synthetic image is generated, thereby eliminating noisy points in the image and avoiding that the noisy points affects a picture effect of the finally synthesized image.

During image synthesis, only areas with higher luminance in the image are superposed and other areas are not superposed, so that luminance of the bright area and the dark areas is kept and a light painting effect of the synthetic image is improved.

Although each synthetic image is continuously generated, there actually exists a certain time interval between every two adjacent images, and the time interval is shorter on the condition that the calculation speed is higher; and in addition, the image generation speed also influences the image data collecting speed in Step 101, the image data in the caching module is read faster on the condition that the image generation speed is higher, and the space of the caching module is emptied faster, thereby increasing the image data collecting speed of the mobile terminal.

Step 103: the synthetic image is displayed in real time.

The mobile terminal displays the synthetic image on a display screen in real time for the user to preview a current light painting effect in real time. In order to achieve a smooth previewing effect, the synthetic image displayed by the mobile terminal is a compressed small-scale thumbnail, and the full-scale image is stored, that is, display and storage are implemented as two threads.

The user presses the shooting key again or presses an end key to end shooting.

The mobile terminal may locally store each synthetic image, or only store the last synthetic image generated at the end of shooting.

Therefore, the light painting photography function is added to the mobile terminal, the user may utilize the light painting photography function of the mobile terminal for artistic creation and preview the creation effect in real time, and the user experience is improved.

Figure 3:
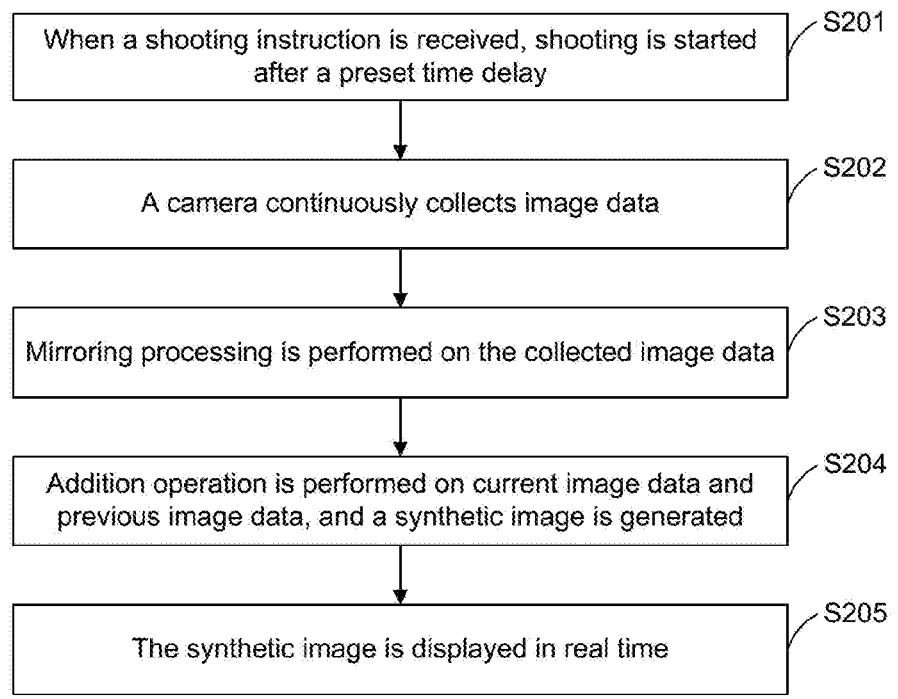
FIG. 3 is a flowchart of a second embodiment of a shooting method for a mobile terminal according to the disclosure.

Referring to FIG. 3, the disclosure discloses a second embodiment of a shooting method for a mobile terminal, and the shooting method includes the following steps.

Step 201: when a shooting instruction is received, shooting is started after a preset time delay.

In order to avoid influence of slight shake generated when a shooting key is pressed on a shooting effect, an anti-shake function is realized by delayed shooting in the embodiment. That is, after a user presses the shooting key to send the shooting instruction, the mobile terminal does not perform shooting immediately, and instead, starts shooting when manmade shake is stopped after the preset time delay. The preset time delay is preferably 1 to 3 seconds.

Step 202: a camera continuously collects image data.

Step 203: mirroring processing is performed on the collected image data.

Since the user or a creator usually faces the camera when performing artistic creation and a light-painted picture captured by a rear camera forms a mirror relationship with a picture actually created by the creator. In view of that, in the embodiment, after the image data is collected, mirroring processing is performed on the collected image data and then the processed image data is sent to a caching module or directly sent to an image synthesis module which generates a synthetic image. In some embodiments, the mobile terminal may ask the user on the condition that it is required to perform mirroring processing on the image and perform a corresponding operation according to selection of the user.

Step 204: addition operation is performed on current image data and previous image data, and a synthetic image is generated.

Step 205: the synthetic image is displayed in real time.

Mirroring processing is performed on the image data which is collected in advance, and the synthetic image displayed at this moment is completely consistent with work actually created by the creator, so that the creator is not required to perform mirroring processing on the work in advance, difficulty in light painting creation of the user is reduced, and the user experience is improved.

In some embodiments, when the rear camera is utilized for shooting, mirroring processing may also be performed on the synthetic image after the synthetic image is generated, and then the processed synthetic image is displayed and stored in real time.

In some embodiments, the user is allowed to switch a front camera and the rear camera, and when the front camera is utilized for shooting, an image collected by the front camera is completely consistent with the actually created work without mirroring processing; and in addition, the creator may preview own work while he/she performs the light painting creation, so as to timely and correct and regulate the work, so that creation efficiency is improved and a creation experience is improved.

Figure 4:
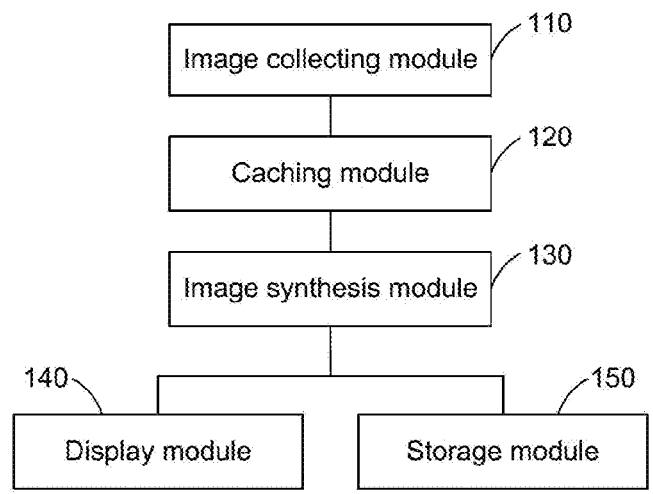
FIG. 4 is a schematic module diagram of a first embodiment of a mobile terminal according to the disclosure.

Referring to FIG. 4, a first embodiment of a mobile terminal of the disclosure is disclosed, the mobile terminal may be an ordinary digital camera such as a pocket camera, and may also be terminal equipment such as a mobile terminal, a tablet and the like with a shooting function, and the mobile terminal is a mobile terminal which implements the abovementioned light painting photography shooting method, and includes an image collecting module 110, a caching module 120, an image synthesis module 130, a display module 140 and a storage module 150, wherein the image collecting module 110, the caching module 120 and the image synthesis module 130 are sequentially connected, and the image synthesis module 130 is connected with the display module 140 and the storage module 150 respectively.

The image collecting module 110 is configured to call a camera to collect image data.

According to the disclosure, a light painting photography mode is added to a shooting function of the mobile terminal, and a user may select the light painting photography mode or an ordinary camera shooting mode for shooting, wherein the light painting photography mode regulates and limits parameters such as an ISO, quality of a picture, a scene mode and the like in advance with reference to a requirement of a light painting photography scene, and outputs the parameter to related hardware equipment to enable the related hardware equipment such as the image collecting module 110 to perform sample selection or processing on the collected image data. When the user selects the light painting photography mode and presses a shooting key or triggers a virtual shooting key, the mobile terminal starts light painting shooting, the image collecting module 110 calls the camera to continuously collect the image data, and a speed in which the image data is continuously collected by the camera may be preset.

The camera is required to continuously collect at least more than 10 images within 1 second to ensure light painting continuity, but subsequent image synthesis processing usually may not keep following image collecting, so that the image collecting module 110 sends the collected image data to the caching module 120 for storage. Furthermore, in the process of collecting an image data, the image collecting module 110 may regulate the collecting speed in real time according to a free space of the caching module 120, thereby maximally utilizing a processing capability of the mobile terminal and preventing data overflow and further data loss caused by excessively high collecting speed.

The caching module 120 is configured to cache the collected image data.

The image synthesis module 130 is configured to read the image data from the caching module 120, perform addition operation on current image data and previous image data, namely superpose pixels in the current image data and the previous image data, and generate a synthetic image. Speed or time interval in which of the image data is read by the image synthesis module 130 may be preset, or depends on its calculation speed. The camera continuously collects the image data, so that the synthetic image is also continuously generated in real time.

Preferably, the image synthesis module 130 selects pixels meeting a preset condition from the current image data and the previous image data, and then performs addition operation on the pixels.

In some embodiments, when judging whether a certain pixel meets the preset condition or not, the image synthesis module 130 may directly judge whether a luminance parameter of the pixel is more than its threshold value or not, and on the condition that the luminance parameter of the pixel is more than its threshold value, determines that the pixel meets the preset condition. After selecting pixels of which luminance parameters are more than its threshold value from the current image data and the previous image data (that is, absolute values of luminance of certain points on the image are more than its threshold value), the image synthesis module 130 only performs addition operation on these pixels meeting the preset condition, thereby filtering pixels with lower luminance to a certain extent and avoiding that an ambient light accumulation effect pollutes a picture of the finally synthesized image. A magnitude of the threshold value may be determined on the basis of a principle that about 20 percent of pixels with lower luminance in the image are filtered out, and may also be determined according to mean luminance of the image; and the luminance parameter is an optical parameter such as an RGB value, a YUV value and the like.

For example, the image data includes totally n pixel units, i.e. pixel unit 1, pixel unit 2 . . . pixel unit n, wherein luminance parameters of pixel units 101 to 200 in the current image data are more than its threshold value, luminance parameters of pixel units 1 to 100 in the previous image data are more than its threshold value, and then addition operation is performed on the current and previous luminance parameters of pixel units 1 to 200. On the condition that a luminance parameter value of pixel unit 1 in the current image data is 10 while the luminance parameter value in the previous image data is 100, the luminance parameter value of pixel unit 1 in the synthetic image is 100+10=110 as a result of the addition operation. In addition, the image synthesis module further performs noise reduction processing on the synthetic image, and also controls a synthesis proportion of the new synthetic image to inhibit overexposure according to exposure of the existing image.

In a preferred embodiment, when judging whether a certain pixel meets the preset condition or not, the image synthesis module judges whether the pixel is a sudden changing pixel or not, on the condition that the pixel is a sudden changing pixel, calculates a mean value of luminance parameters of a preset number of pixels around the sudden changing pixel, judges whether the mean value is more than its threshold value or not, on the condition that the mean value is more than its threshold value, determines that the pixel meets the preset condition, on the condition that the pixel is not a sudden changing pixel, directly judges whether a luminance parameter of the pixel is more than its threshold value or not, and on the condition that the luminance parameter is more than its threshold value, determines that the pixel meets the preset condition. A specific judgment method is described in the method embodiment shown in FIG. 2, and will not be elaborated herein. Therefore, noisy points in the image are eliminated, and influence on a picture effect of the finally synthesized image is avoided.

During image synthesis, only areas with higher luminance in the image are superposed and other areas are not superposed, so that luminance of the bright area and the dark areas is kept and a light painting effect of the synthetic image is improved.

Then the image synthesis module 130 sends the synthetic image to the display module 140 for display and to the storage module 150 for storage. The image synthesis module 130 may send each synthetic image to the storage module 150, or sends the last synthetic image generated at the end of shooting to the storage module 150.

In order to achieve a smooth previewing effect, the image synthesis module 130 compresses the synthetic image into a small-scale thumbnail, and sends the thumbnail to the display module 140 for display.

The display module 140 is configured to display the synthetic image in real time for the user to preview a current light painting effect in real time.

The storage module 150 is configured to store the synthetic image.

Therefore, the light painting photography function is added to the mobile terminal, the user may utilize the light painting photography function of the mobile terminal for artistic creation and preview the creation effect in real time, and the user experience is improved.

Figure 5:
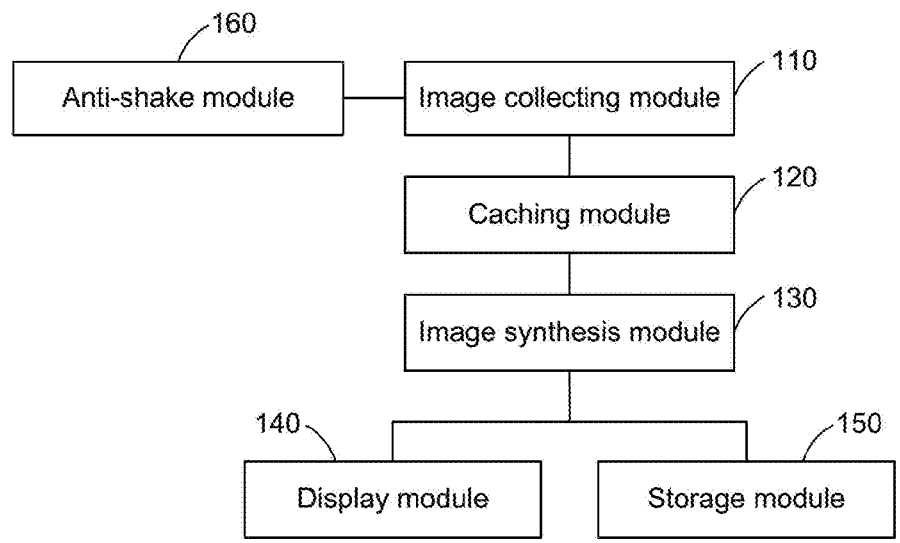
FIG. 5 is a schematic module diagram of a second embodiment of a mobile terminal according to the disclosure.

In a second embodiment shown in FIG. 5, the mobile terminal further has an anti-shake function during light painting photography. The difference between the present embodiment and the first embodiment is that an anti-shake module 160 is added, the anti-shake module 160 is connected with the image collecting module 110, and is configured to receive a shooting instruction, and after receiving the shooting instruction, transmit the shooting instruction to the image collecting module 110 after a preset time delay, and the image collecting module 110 starts collecting images only after receiving the shooting instruction. That is, after the user presses the shooting key to send the shooting instruction, the mobile terminal does not perform shooting immediately, and instead, starts shooting when manmade shake is stopped after the preset time delay. The preset time delay is preferably 1 to 3 seconds.

Therefore, the anti-shake function is realized by delayed shooting to avoid influence of slight shake generated when the shooting key is pressed on a shooting effect and further improve a shooting experience of the user.

Figure 6:
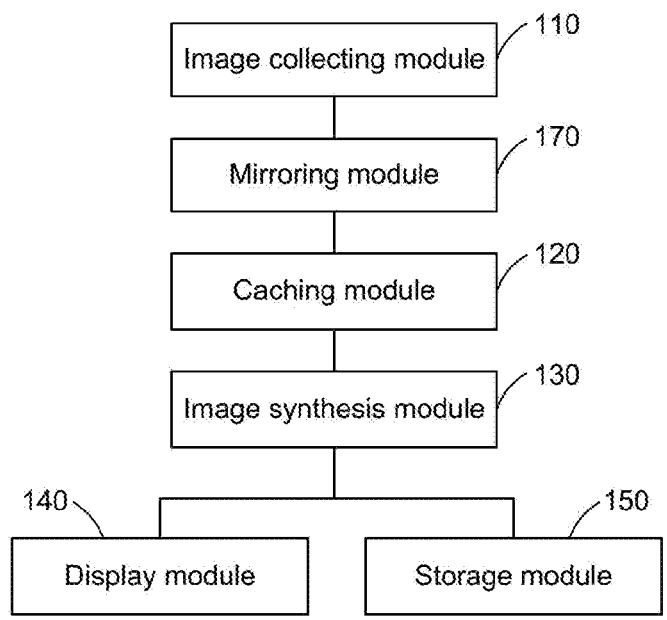
FIG. 6 is a schematic module diagram of a third embodiment of a mobile terminal according to the disclosure.

FIG. 6 shows a third embodiment of the mobile terminal of the disclosure, and the difference between the present embodiment and the first embodiment is that a mirroring module 170 is added, wherein the image collecting module 110, the mirroring module 170 and the caching module 120 are sequentially connected, and the mirroring module 170 judges whether the currently used camera is a rear camera or not, performs mirroring processing on the collected image on the condition that the currently used camera is the rear camera, transmits the processed image to the caching module 120, and on the condition that the currently used camera is not the rear camera, does not perform any processing and directly transmits the image to the caching module 120.

During light painting photography of the mobile terminal of the embodiment, the user is allowed to freely switch a front camera and the rear camera. Since the user or a creator usually faces the camera when performing artistic creation, a light-painted picture collected when the image collecting module 110 calls the rear camera to collect the image data forms a mirror relationship with a picture actually created by the creator. In view of that in the embodiment, after the image collecting module 110 collects the image data, the mirroring module 170 performs mirroring processing on the collected image data, and then sends the processed image data to the caching module 120, and the synthetic image generated at this moment is completely consistent with work actually created by the creator. Therefore, the creator is not required to perform mirroring processing on the work, difficulty in light painting creation of the user is reduced, and the user experience is improved.

When the image collecting module 110 calls the front camera to collect the image data, the collected image is completely consistent with the actually created work without mirroring processing; and moreover, the creator may also preview own work in real time while he/she performs the light painting creation to timely correct and regulate the work, so that creation efficiency is improved and a creation experience is improved.

In some embodiments, the mirroring module 170 may also be connected with the image synthesis module 130, the display module 140 and the storage module 150 respectively, and after determining that the currently used camera is the rear camera, performs mirroring processing on the synthetic image generated by the image synthesis module 130 and sends the processed synthetic image to the display module 140 and the storage module 150 for real-time display and storage respectively.

In some embodiments, the mirroring module 170 may further directly ask the user whether it is required to perform mirroring processing, and on the condition that it is required to perform mirroring processing, performs mirroring processing on the collected image data or the synthetic image.

In some embodiments, the caching module 120 of the mobile terminal may also be omitted, the image collecting module 110 or the mirroring module 170 directly sends the image data to the image synthesis module 130 for image synthesis, in which case, a processing speed of the image synthesis module 130 is required to be high enough to keep following the image data collecting speed of the camera.

The mobile terminal and its shooting method of the disclosure are applicable to other similar application scenes, besides the light painting photography scene.

The mobile terminal of the embodiment of the disclosure simulates long-time exposure by adopting an image superposing technology, instead of performing long-time exposure by using camera shooting hardware, regulates and limits the parameters such as the ISO, the quality of the picture, the scene mode and the like with reference to the requirement of the light painting photography scene, outputs the parameter to the hardware equipment and collects the image data to synthesize the image to realize the light painting photography function.

Those skilled in the art should understand that all or part of the steps in the method embodiments may be implemented by a program controlling related hardware, and the program may be stored in a computer-readable storage medium including for example a Read-Only Memory/Random Access Memory (ROM/RAM), a magnetic disk, a compact disc and the like.

The description made above with reference to the drawings is only the preferred embodiment of the disclosure and not intended to limit the scope of protection of the disclosure. Those skilled in the art may implement the disclosure with various transformed solutions without departing from the scope and substance of the disclosure, and for example, a characteristic of one embodiment may be used in another embodiment to obtain another embodiment. Any modifications, equivalent replacements and improvements made within the technical concept of the disclosure shall fall within the scope of protection of the disclosure.

INDUSTRIAL APPLICABILITY

According to the mobile terminal and shooting method thereof provided by the disclosure, the image data is continuously collected, addition operation is performed on the current image data and the previous image data, and the synthetic image is generated and displayed in real time, so that long-time exposure is simulated by adopting the image superposing technology, the light painting photography function is added to the mobile terminal, then the user may utilize the light painting photography function of the mobile terminal for artistic creation and preview the creation result in real time, and the user experience is improved.

What is claimed is:

1. A shooting method for a mobile terminal, comprising steps of:
   starting a light painting shooting mode;
   continuously collecting, by a camera, image data;
   reading the image data at time intervals, selecting pixels meeting a preset condition from a current image data and a previous image data according to luminance parameters of the pixels, and performing addition operation on the pixels at the same position of the current image data and the previous image data, and generating a synthetic image; and
   displaying the synthetic image in real time;
   wherein selecting pixels meeting the preset condition comprises:
   judging whether the pixel is a sudden changing pixel or not;
   on the condition that the pixel is a sudden changing pixel, calculating a mean value of luminance parameters of a preset number of pixels around the sudden changing pixel, judging whether the mean value is more than its threshold value or not, and on the condition that the mean value is more than its threshold value, determining that the sudden changing pixel meets the preset condition, and selecting the sudden changing pixel; and
   on the condition that the pixel is not a sudden changing pixel, further judging whether the luminance parameter of the pixel is more than its threshold value or not, and on the condition that the luminance parameter of the pixel is more than its threshold value, determining that the pixel meets the preset condition, and selecting the pixel.

2. The shooting method according to claim 1, wherein the camera is a rear camera, and the method further comprises: performing mirroring processing on the collected image data after the step of continuously collecting, by the camera, the image data.

3. The shooting method according to claim 1, wherein the camera is a rear camera, and the method further comprises: performing mirroring processing on the synthetic image after the step of generating the synthetic image.

4. The shooting method according to claim 1, wherein the camera is a front camera.

5. The shooting method according to claim 1, further comprising: before the step of continuously collecting, by the camera, the image data,
   when a shooting instruction is received, starting shooting after a preset time delay.

6. A mobile terminal, comprising an image collecting module, an image synthesis module and a display module, wherein
   the image collecting module is configured to, after a camera entering a light painting shooting mode, call the camera to continuously collect image data;
   the image synthesis module is configured to read the image data at time intervals, select pixels meeting a preset condition from a current image data and a previous image data according to luminance parameters of the pixels, and perform addition operation on the pixels at the same position of the current image data and the previous image data, and generate a synthetic image; and the display module is configured to display the synthetic image in real time;

wherein the image synthesis module is further configured to:

judge whether the pixel is a sudden changing pixel or not;

on the condition that the pixel is a sudden changing pixel, calculate a mean value of luminance parameters of a preset number of pixels around the sudden changing pixel, judge whether the mean value is more than its threshold value or not, and on the condition that the mean value is more than its threshold value, determine that the sudden changing pixel meets the preset condition and select the sudden changing pixel; and on the condition that the pixel is not a sudden changing pixel, further judge whether the luminance parameter of the pixel is more than its threshold value or not, and on the condition that the luminance parameter of the pixel is more than its threshold value, determine that the pixel meets the preset condition and select the pixel.

7. The mobile terminal according to claim 6, further comprising a mirroring module which is configured to: judge whether the currently used camera is a rear camera or not, and on the condition that the currently used camera is the rear camera, perform mirroring processing on the collected image.

8. The mobile terminal according to claim 6, further comprising a mirroring module which is configured to: judge whether the currently used camera is a rear camera or not, and on the condition that the currently used camera is the rear camera, perform mirroring processing on the synthetic image.

9. The mobile terminal according to claim 6, wherein the camera is a front camera.

10. The mobile terminal according to claim 6, further comprising an anti-shake module which is configured to, when a shooting instruction is received, send the shooting instruction to the image collecting module after a preset time delay.

11. A shooting method for a mobile terminal, comprising steps of:

continuously collecting, by a camera, image data;

reading the image data at time intervals, performing addition operation on current image data and previous image data, and generating a synthetic image; and displaying the synthetic image, wherein the step of performing addition operation on the current image data and the previous image data comprises:

selecting pixels meeting a preset condition from the current image data and the previous image data, and performing addition operation on the pixels at the same position, and wherein the step of selecting the pixels meeting the preset condition comprises:

judging whether the pixel is a sudden changing pixel or not;

on the condition that the pixel is a sudden changing pixel, calculating a mean value of luminance parameters of a preset number of pixels around the sudden changing pixel, judging whether the mean value is more than its threshold value or not, and on the condition that the mean value is more than its threshold value, determining that the sudden changing pixel meets the preset condition, and selecting the sudden changing pixel; and on the condition that the pixel is not a sudden changing pixel, further judging whether the luminance parameter of the pixel is more than its threshold value or not, and on the condition that the luminance parameter of the pixel is more than its threshold value, determining that the pixel meets the preset condition, and selecting the pixel.

12. The shooting method according to claim 11, wherein the camera is a rear camera, and the method further comprises: performing mirroring processing on the collected image data after the step of continuously collecting, by the camera, the image data.

13. The shooting method according to claim 11, wherein the camera is a rear camera, and the method further comprises: performing mirroring processing on the synthetic image after the step of generating the synthetic image.

14. The shooting method according to claim 11, wherein the camera is a front camera.

15. The shooting method according to claim 11, further comprising:

before the step of continuously collecting, by the camera, the image data, when a shooting instruction is received, starting shooting after a preset time delay.

* * * * *